United States Patent [19]
Abramson et al.

[11] Patent Number: 5,898,854
[45] Date of Patent: Apr. 27, 1999

[54] APPARATUS FOR INDICATING AN OLDEST NON-RETIRED LOAD OPERATION IN AN ARRAY

[75] Inventors: Jeffrey M. Abramson, Aloha; Kris G. Konigsfeld, Portland, both of Oreg.

[73] Assignee: Intel Corporation, Santa Clara, Calif.

[21] Appl. No.: 08/408,738

[22] Filed: Mar. 22, 1995

Related U.S. Application Data

[63] Continuation-in-part of application No. 08/177,164, Jan. 4, 1994, Pat. No. 5,724,536.

[51] Int. Cl.$^6$ .................................................. G06F 13/12
[52] U.S. Cl. ............................ 395/394; 711/135; 711/136
[58] Field of Search ............................... 395/427, 462, 395/463, 452, 394, 393, 395, 800.23; 711/136, 135

[56] References Cited

U.S. PATENT DOCUMENTS

| | | | |
|---|---|---|---|
| 4,322,795 | 3/1982 | Lange et al. | 395/463 |
| 4,722,049 | 1/1988 | Lahti | 364/200 |
| 4,803,615 | 2/1989 | Johnson | 364/200 |
| 4,807,113 | 2/1989 | Matsumoto et al. | 364/200 |
| 4,991,090 | 2/1991 | Emma et al. | 364/200 |
| 5,063,497 | 11/1991 | Cutler et al. | 395/800 |
| 5,146,570 | 9/1992 | Hester et al. | 395/375 |
| 5,197,130 | 3/1993 | Chen et al. | 395/325 |
| 5,372,974 | 12/1994 | Doan et al. | 437/240 |
| 5,401,680 | 3/1995 | Abt et al. | 437/52 |
| 5,493,667 | 2/1996 | Huck et al. | 395/452 |
| 5,586,295 | 12/1996 | Tran | 395/464 |
| 5,606,670 | 2/1997 | Abramson et al. | 711/154 |
| 5,664,215 | 9/1997 | Burgess et al. | 395/800.23 |
| 5,694,553 | 12/1997 | Abramson et al. | 395/800.23 |
| 5,724,536 | 3/1998 | Abramson et al. | 395/392 |
| 5,745,729 | 4/1998 | Greenley et al. | 395/458 |

OTHER PUBLICATIONS

Johnson, Mike; *Superscalar Microprocessor Design*; Prentice Hall, Inc., New Jersey, 1991.

Popescu, et al.; "The Metaflow Architecture", IEEE Micro, Jun. 1991, pp. 10–13 and 63–73 Johnson, Mike; "Superscalar Microprocessor Design", Englewood Cliffs, N.J., Prentice Hall, 1991.

Smith, et al.; "Implementing Precise Interrupts in Pipeland Processors," I.E.E.E. Transactions on Computers, May 1988, pp. 562–573.

*Primary Examiner*—Thomas C. Lee
*Assistant Examiner*—Gautam R. Patel
*Attorney, Agent, or Firm*—Blakely, Sokoloff, Taylor & Zafman LLP

[57] ABSTRACT

The present invention provides a buffer management scheme for load operations that permits load operations to be stored for execution to memory. The buffer management scheme of the present invention maintains pointers identifies entries in the memory containing the oldest load operation and the next available location in the memory for a new load operation. By providing such management, the present invention allows memory operations and their execution by a device, such as a processor, to be coordinated with the operation of the system and other operations in the processor.

22 Claims, 13 Drawing Sheets

APPARATUS FOR INDICATING AN OLDEST NON-RETIRED LOAD OPERATION IN AN ARRAY

The present U.S. patent application is a continuation-in-part application of U.S. patent application 08/177,164, now U.S. Pat. No. 5,724,536, filed Jan. 4, 1994.

FIELD OF THE INVENTION

The present invention relates to the field of computer systems; more particularly, the present invention relates to performing load operations in a computer system and managing a buffer storing load operations when a variable number of stored load operations may be retired and deallocated from the buffer during a clock cycle.

BACKGROUND OF THE INVENTION

A computer system may be divided into three basic blocks: a central processing unit (CPU), memory, and input/output (I/O) units. These blocks are coupled to each other by a bus. An input device, such as a keyboard, mouse, stylus, analog-to-digital converter, etc., is used to input instructions and data into the computer system via an I/O unit. These instructions and data can be stored in memory. The CPU receives the data stored in the memory and processes the data as directed by a set of instructions. The results can be stored back into memory or outputted via the I/O unit to an output device, such as a printer, cathode-ray tube (CRT) display, digital-to-analog converter, etc.

The CPU receives data from memory as a result of performing load operations. Each load operation is typically initiated in response to a load instruction. The load instruction specifies an address to the location in memory at which the desired data is stored. The load instruction also usually specifies the amount of data that is desired. Using the address and the amount of data specified, the memory may be accessed and the desired data obtained.

Some computer systems have the capabilities to execute instructions out-of-order. In other words, the CPU in the computer system is capable of executing one instruction before a previously issued instruction. This out-of-order execution is permitted because there was no dependency between the two instructions. That is, the subsequently issued instruction does not rely on a previously issued unexecuted instruction for its resulting data or its implemented result. The CPU may also be capable of executing instructions speculatively, wherein conditional branch instructions may cause certain instructions to be fetched and issued based on a prediction of the condition. Therefore, depending on whether the CPU predicted correctly, the CPU will be either executing the correct instructions or not. Branch prediction and is relationship with speculative execution of instructions is well-known in the art. For a detailed explanation of speculative out-of-order execution, see M. Johnson, *Superscalor Microprocessor Design*, Prentice Hall, 1991. Speculative and out-of-order execution offer advantages over the prior art, including better use of resources.

However, memory operations typically must be executed in order to maintain memory consistency, especially when their execution would create incorrect results.

If multiple load operations may be executed at the same time, yet memory ordering still is being observed, the execution and retirement of memory operations must be managed. It is desirable to be able to manage the out-of-order execution and retirement of memory operations.

The present invention provides management for load operations that insures memory ordering while allowing multiple load operations to be retired at the same time.

SUMMARY OF THE INVENTION

The present invention provides an apparatus for use in a system, that includes a bus, an issue unit, an array and an array management mechanism. The issue unit issues operations including load operations in response to instructions. The array has entries to store a predetermined number of load operations that are issued from the issue unit. The array stores the load operations prior to dispatch to memory for their execution. The array management mechanism maintains an indication as to which entry contains the oldest non-retired load operation among the predetermined number of load operations. The array management mechanism updates the indication every clock cycle based on retirement and of one or more load operations and the deallocation of their corresponding entries in the array.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

An apparatus for executing load operations is described. In the following detailed description of the present invention numerous specific details are set forth, such as specific number of bits, address sizes, numbers of entries, etc., in order to provide a thorough understanding of the present invention. However, it will be apparent to one skilled in the art that the present invention may be practiced without these specific details. In other instances, well-known structures and devices are shown in block diagram form, rather than in detail, so as not to obscure the present invention.

Overview of the Execution of Load Operations

The present invention performs the load operations in response to load instructions executed in the computer system. The load instructions are received and executed by a processor in the computer system. In performing the load operations, the present invention insures that there are no memory ordering violations, even though these operations may be performed out-of-order.

Figure 1:
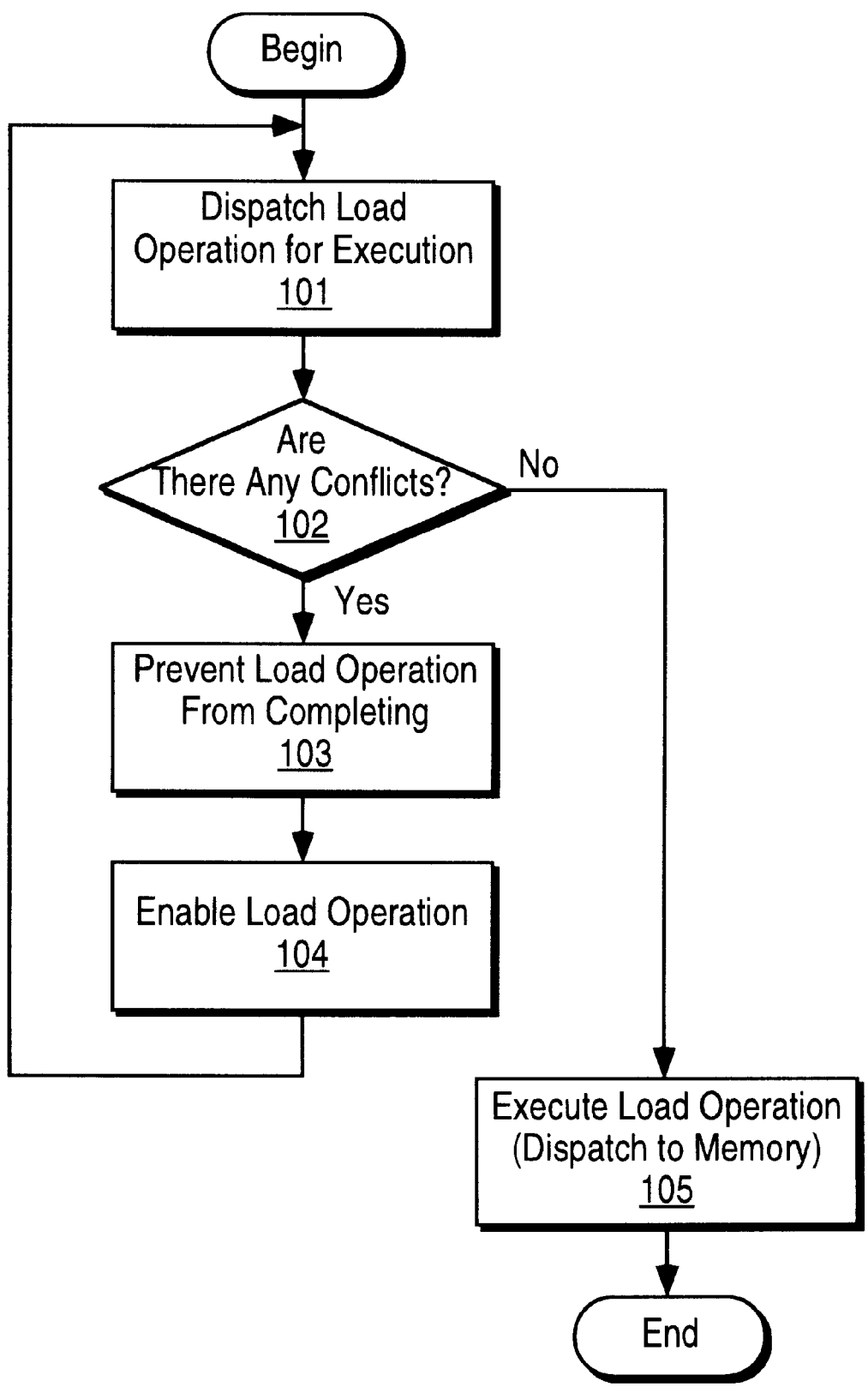
FIG. 1 is a flow diagram illustrating the process of the present invention.

The process for performing a load operation in the present invention is depicted in the flow diagram of FIG. 1. Referring to FIG. 1, the load operation is initially dispatched into the memory subsystem for execution in the computer system (processing block 101). In the present invention, this dispatch occurs when there are no data dependencies on the load operation. A test then determines whether there are any conflicts (other than data depending conflicts) that might exist between the load operation and previously dispatched store operations which could possibly result in incorrect data being loaded into the processor as a result of the execution of the load (processing block 102). The present invention provides several mechanisms for detecting when conflicts arise, such that speculative execution may be used as much as possible. In the present invention, these conflicts may be due to address dependencies where the source address of the load operation may be the same as a destination address of one of the currently dispatched, yet not completed, store operations. The present invention is able to track address dependencies between load and store operations by assigning an identification to each load operation to identify its relative temporal position with respect to the sequential stream of store operations. Using the identification, the present invention identifies the set of store operations, if any, that potentially conflict with the load operation. The present invention also identifies conflicts due to resource dependencies. Resource dependencies exist when a resource required for execution of the load operation is currently in use or unavailable for one of a number of reasons, such that the load operation cannot gain control of the resource for its execution.

If the present invention identifies either such a conflict or condition (e.g., a resource or address dependency), then processing continues at processing block 103, where the load is temporarily prevented, or "blocked", from completion for a predetermined period of time (e.g., the current cycle). The load operation is enabled, or "awakened" when the conditions or conflicts that resulted in the block are no longer in existence (processing block 104) and processing continues at processing block 101 when the process is repeated. If the present invention does not identify any conflicts, then processing also continues at processing block 105. At processing block 105, the load operation is dispatched to memory to retrieve the desired data after which the load operation may be retired (committed to processor state).

Overview of the Computer System of the Present Invention

Figure 2A:
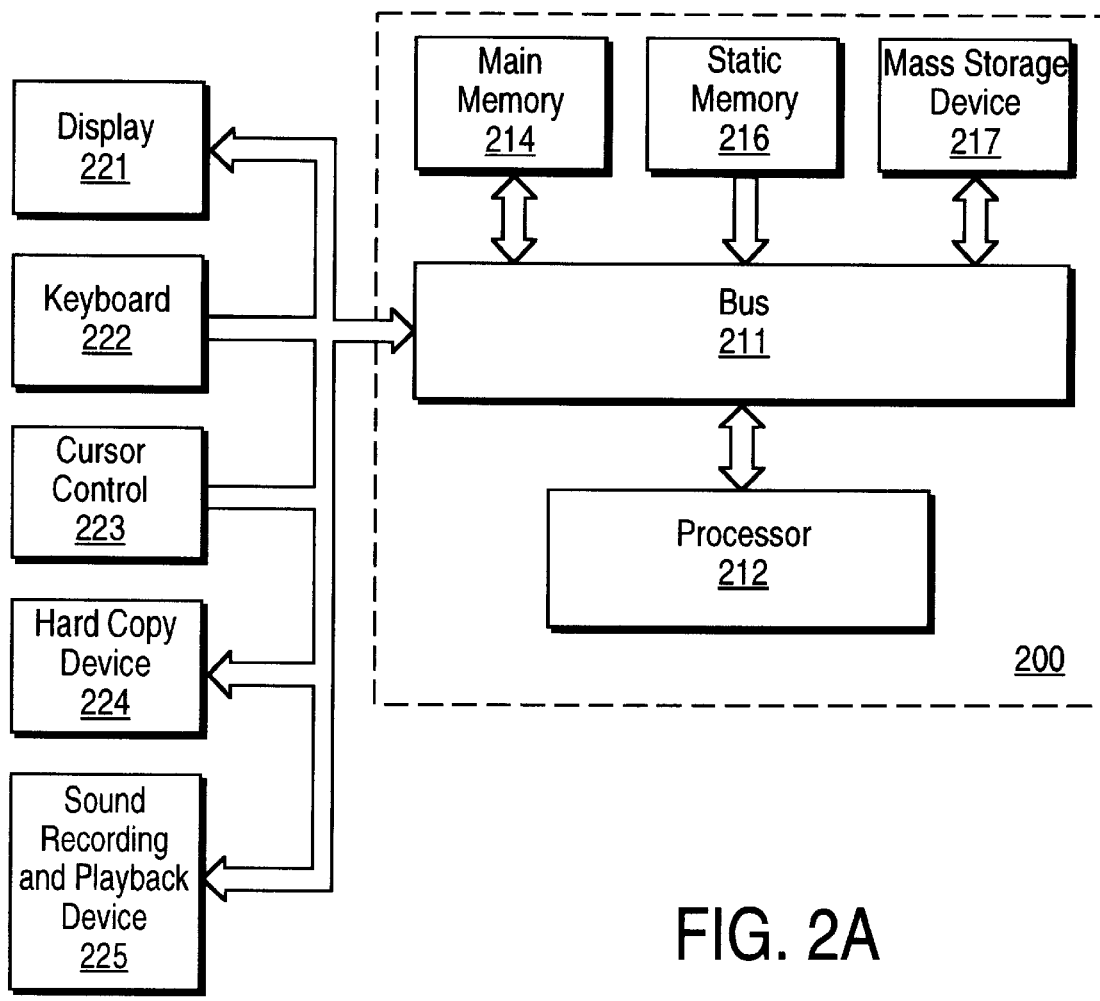
FIG. 2A is a block diagram of the computer system of the present invention.

Referring to FIG. 2A, the computer system upon which one embodiment of the present invention is implemented is shown as 200. Computer system 200 comprises a bus or other communication means 211 for communicating information, and a processor 212 coupled with bus 211 for processing information. Processor 212 includes, but is not limited to microprocessors such as an Intel Architecture Microprocessor, manufactured by, for instance, Intel Corporation of Santa Clara, Calif., the corporate assignee of the present invention. Processor 212 may also be another microprocessor, compatable or otherwise, such as the PowerPC™, Alpha™, etc.

System 200 further comprises a random access memory (RAM) or other dynamic storage device 214 (referred to as main memory), coupled to bus 211 for storing information and instructions to be executed by processor 212. Main memory 214 also may be used for storing temporary variables or other intermediate information during execution of instructions by processor 212. Computer system 200 also comprises a read only memory (ROM) and/or other static storage device 216 coupled to bus 211 for storing static information and instructions for processor 212, and a data storage device 217 such as a magnetic disk or optical disk and its corresponding disk drive. Data storage device 217 is coupled to bus 211 for storing information and instructions.

Computer system 200 may further be coupled to a display device 221, such as a cathode ray tube (CRT) or liquid crystal display (LCD) coupled to bus 211 for displaying information to a computer user. An alphanumeric input device 222, including alphanumeric and other keys, may also be coupled to bus 211 for communicating information and command selections to processor 212. An additional user input device is cursor control 223, such as a mouse, a trackball, stylus, or cursor direction keys, coupled to bus 211 for communicating direction information and command selections to processor 212, and for controlling cursor movement on display 211. Another device which may be coupled to bus 211 is hard copy device 224 which may be used for printing instructions, data, or other information on a medium such as paper, film, or similar types of media. Furthermore, a sound recording and playback device, such as a speaker and microphone may optionally be coupled to bus 211 for interfacing with computer system 200. Note that any or all of the components of system 200 and associated hardware may be used in a preferred embodiment, however, it can be appreciated that any type of configuration of the system may be used for various purposes as the user requires.

Figure 2B:
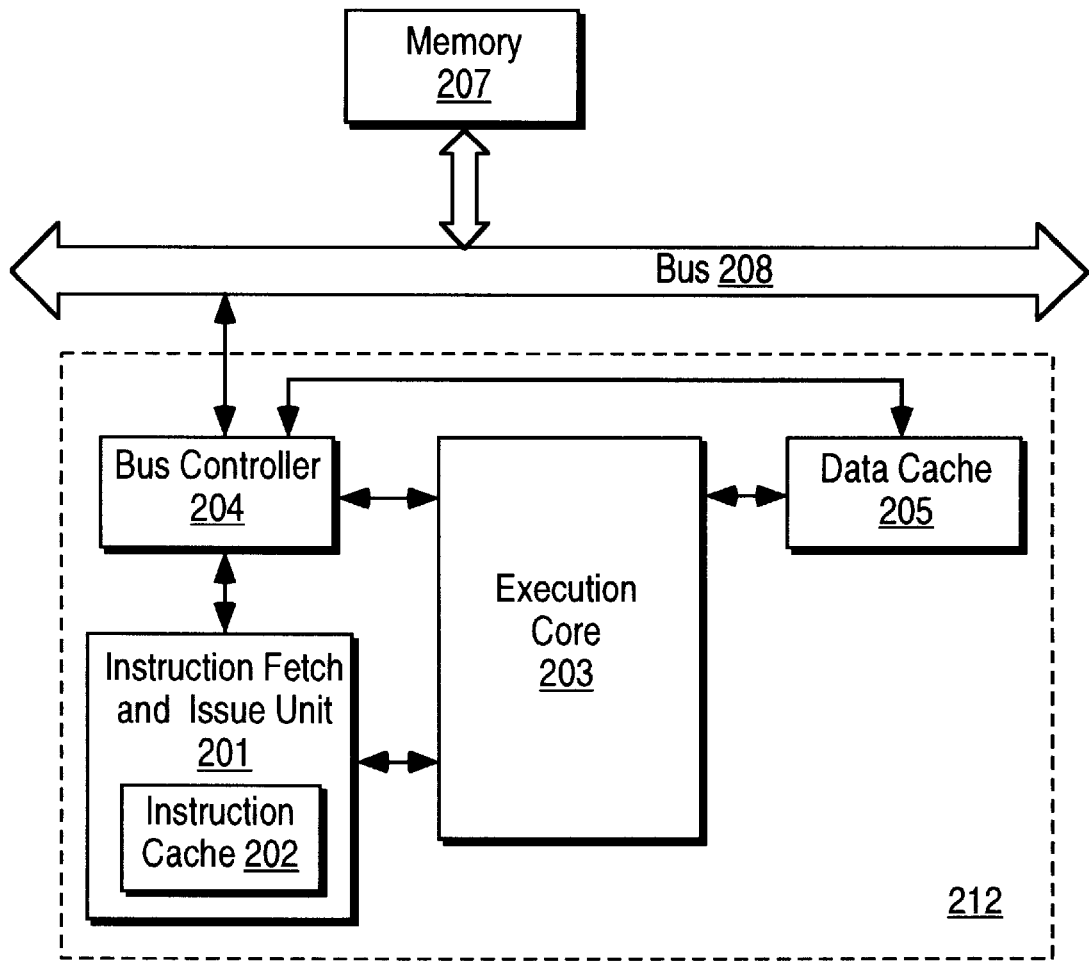
FIG. 2B is a block diagram of the memory subsystem of the present invention.

FIG. 2B is a block diagram of the memory subsystem of the computer system of the present invention. Referring to FIG. 2B, the memory subsystem comprises an instruction fetch and issue unit 201 with an integrated instruction cache 202, an execution core 203, a bus controller 204, a data cache memory 205, a memory unit 207, and a bus 208.

The memory unit 207 is coupled to the system bus. The bus controller 204 is coupled to the bus 208. The bus controller 204 is also coupled to the data cache memory 205 and the instruction fetch and issue unit 201. The instruction fetch and issue unit 201 is also coupled to the execution core 203. The execution core 203 is also coupled to the data cache memory 205. In the present invention, the instruction fetch and issue unit 201, the execution core 203, the bus controller 204, and the data cache memory 205 together comprise the processor 212 (FIG. 2A). In the present invention, elements 201-205 cooperate to fetch, issue, execute and save the execution results of instructions in a pipelined manner.

The instruction fetch and issue unit 201 fetches instructions from an external memory, such as memory unit 207, through the bus controller 204 via bus 208, or any other external bus. The fetched instructions are stored in instruction cache 202. The bus controller 204 manages transfers of data between external components and the processor 102. In addition, it manages cache coherency transfers. The instruction fetch and issue unit 201 issues these instructions in order to the execution core 203. The execution core 203 performs arithmetic and logic operations, such functions as add, subtract, logical AND, and integer multiply, as well as memory operations. Some instructions are fetch and issued speculatively.

The execution core 203 includes an execution unit that holds and executes the integer and floating point instructions when their operand dependencies on execution results of preceding instructions are resolved, including those integer and floating point instructions that are speculatively fetched and issued. Similarly, the execution core 203 also includes a memory execution unit that holds, executes and dispatches load and store instructions to the data cache memory 205 (as well as external memory) as soon as their operand dependencies on execution results of preceding instructions are resolved, including those load and store instructions that are speculatively fetched and issued.

The data cache memory 206 respond to the load instructions immediately, forwarding data if necessary, whereas the store instructions are buffered. In other words, the instructions are not necessarily executed/forward in the order they were issued, and some instructions are speculatively executed/forwarded. However, the execution results of the integer, floating point and load instructions are buffered, and then committed to processor state in program order. The buffered store instructions are committed to processor state in program order and then executed in the "background", at the convenience of the memory system. Speculative integer, floating point and load execution results and buffer stores of mispredicted branches are purged. Note that the speculative nature of fetched, issued and executed instructions is attributed to the uncertainty of whether a particular instruction or set of instructions is to be executed due to an unaffirmed branch prediction.

Instruction fetch and issue unit 201 is intended to represent a broad category of instruction fetching and issuing elements found in many computer systems. Their constitutions and functions are well-known and will be described only as necessary with reference to later figures.

The bus controller 204, the bus 208, and the memory 207 are also intended to represent a broad category of these elements found in most computer systems. Their functions and constitutions are well-known and will not be described further. The execution core 203, incorporating with the teachings of the present invention, and the data cache memory 205 will be described further in detail below with additional references to the remaining figures.

Figure 3:
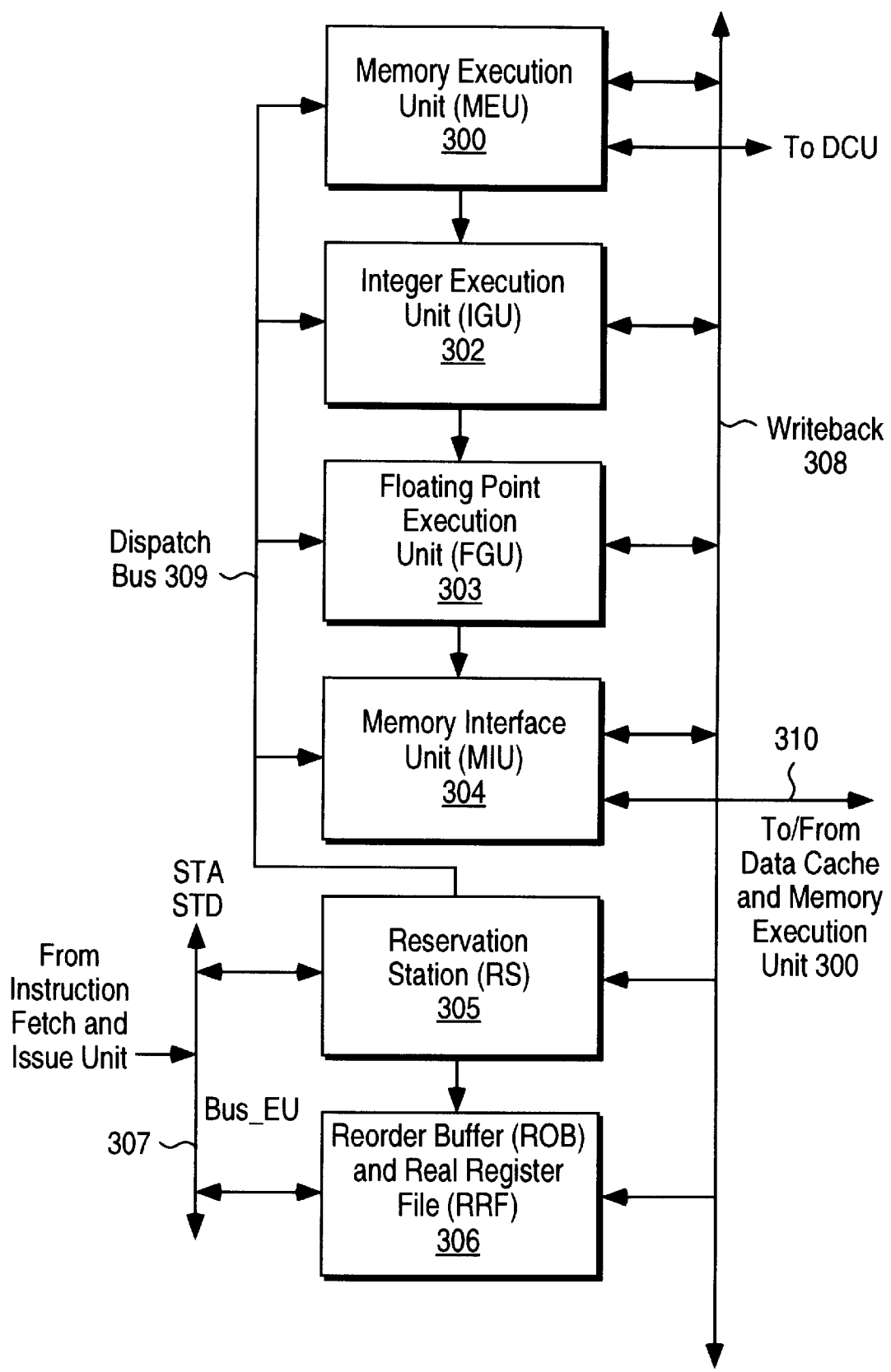
FIG. 3 is a block diagram of one embodiment of the execution unit of the present invention.

FIG. 3 is a block diagram of one embodiment of the execution core of the present invention. Referring to FIG. 3, execution core 203 comprises a reservation station (RS) 305, a memory execution unit (MEU) 300, an integer execution unit (IEU) 302, a floating point execution unit (FEU) 303, a memory interface unit (MIU) 304, a reorder buffer (ROB) and real register file (RRF) 306. Additionally, execution core 203 includes an internal bus (Bus_EU) 307 and a writeback bus 308. MEU 300, IEU 302, FEU 303 and MIU 304 are all coupled to reservation station 305 via a dispatch bus 309. They are also coupled to writeback bus 308. MIU 304 is also coupled to the data cache memory and MEU 300 via bus 310. RS 305 is coupled to the writeback bus 308 and the Bus_EU 307. RS 305 is also coupled to ROB and RRF 306. ROB and RRF 306 is also coupled to the Bus_EU 307 and the writeback bus 308. Together, elements 300–310 are coupled to hold, dispatch, execute and commit execution results of instructions, whereas described earlier, the dispatching and execution of instructions are not necessarily in the order the instructions are issued. That is, the instructions could be dispatched and executed out-of-order. Execution core 203 may include multiple IEUs, such as two or more IEUs.

Reservation station 305 receives and stores the issued instructions resolving their operands with data from the IEU 302, the FEU 303, the data cache memory, the ROB and RRF 306 and holds them until their operands are all resolved. The RS 305 then dispatches the issued instructions to the AGU (described below), the IEU 302, the FEU 303 and the MIU 304 and the MEU 300 as appropriate.

In particular, the load instruction is dispatched as a single operation, whereas the store instruction is dispatched as store address (STA) and stored data (STD) operations to the MEU 300 and MIU 304. Similar to instruction fetching, there is no requirement that the load sources or the store destinations be aligned to memory locations. In other words, the load sources of load instructions and store destinations of store instructions may span two cache lines (or two pages).

The MEU 300, the IEU 302, FEU 303, and the MIU 304, in turn, perform their operations accordingly. The execution results of the integer, floating point and load instructions are held in the ROB 306, and then committed by RRF 306 in the order these instructions were issued. Speculative execution results of the mispredicted branches are not committed, but instead are held in the ROB 306 and purged upon their detections.

Figure 5:
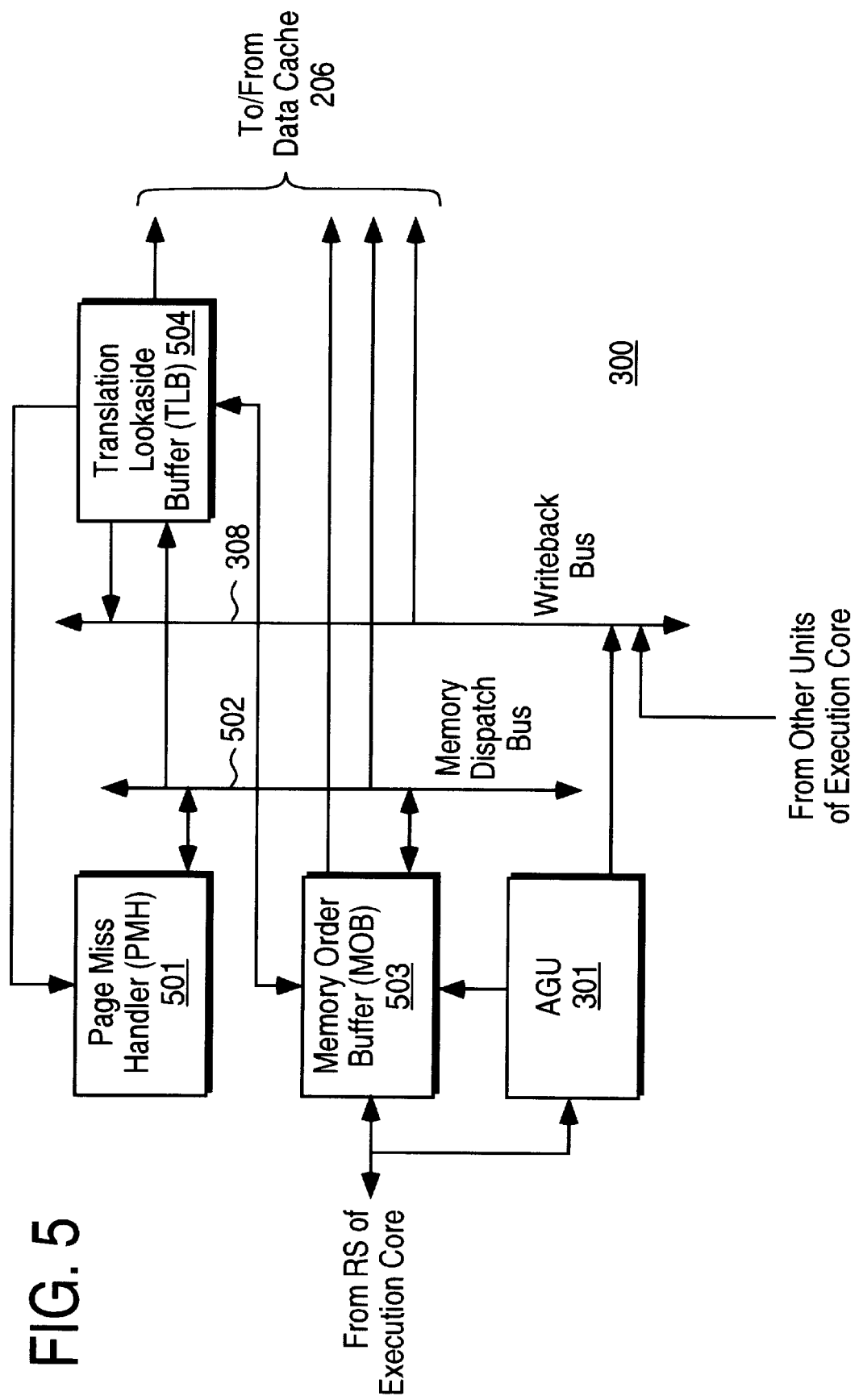
FIG. 5 is a block diagram of the relevant portions of the cache controller of the present invention.

FIG. 5 depicts a block diagram of the relevant portions of one embodiment of the memory execution unit (MEU) of the present invention. Referring to FIG. 5, the MEU 205 includes AGU 505, page miss handler 501, memory order buffer (MOB) 503, and translation lookaside buffer (TLB) 504, as well as memory dispatch 502 and the writeback bus 308. PMH 501 is coupled to the memory dispatch bus 502, writeback bus 308, and TLB 504. MOB 503 is coupled to the reservation station, memory dispatch bus 502, writeback bus 308, the data cache memory and TLB 504. TLB 504 is also coupled to memory dispatch bus 502, writeback bus 308 and the data cache memory 206. Memory dispatch bus 502 and writeback bus 308 are also coupled to the data cache memory 206. AGU 505 is coupled to MOB 503, the writeback bus 308, and the dispatch bus 309.

The AGU 505, MOB 503, PMH 501, and TLB 504 control all load accesses to the data cache memory and, in turn, the memory of the computer system. The AGU 505, MOB 503, PMH 501, and TLB 504 also execute the STA portion of the store. Specifically, MOB 503 buffers the results of the STA execution for the eventual store dispatch to the data cache memory.

The AGU 505 generates the appropriate linear address for the memory operations. The AGU 505 computes the linear address using a base address, a displacement value, a scale value, an index value and a segment value. In one embodiment, the linear address is 32-bits long with a 20 higher order bits identifying a memory page and the 12 low order bits identifying the off-set within the memory page. An example of such an addressing scheme is shown in FIG. 4.

Figure 4:
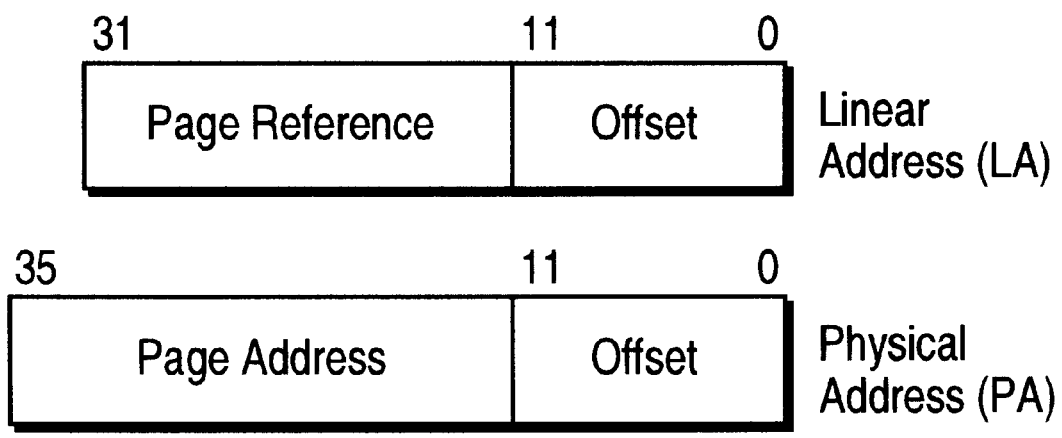
FIG. 4 illustrates an example of one embodiment of the addressing scheme of the present invention.

TLB 504 translates the 32-bit linear address into a 36-bit physical address with 24 higher order bits indicating the memory page, as shown in FIG. 4, and forwards misses to PMH 501. In response, PMH 501 performs page walking and other well-known page miss handling functions. The MOB 503, incorporated with the teachings of the present invention, controls dispatching, buffers all store and load operations, tracks their progress as they move through execution, and then retires (commits them to permanent architectural state) as appropriate. MOB 503 then causes the retired/committed stores to be executed in due course "background" at the convenience of the memory system.

Additionally, MOB 503 responds to load operations by forwarding buffered data as necessary. When an operation is dispatched and cannot complete due to some address or resource conflict, MOB 503 blocks the operation and stores the dependency information. MOB 503 redispatches block operations when the blocking source is removed. Some memory operations cannot execute speculatively, MOB 503 controls the necessary monitoring and dispatched these non-speculative operations at the correct time. For instance, MOB 503 snoops the source addresses of instructions fetched and generates a single stall signal for the bus controller to stall an instruction fetch whenever the source address instruction being fetched substantially matches any of the addresses of the store destinations of the buffered stored instructions. For more information of the blocking of operations, see U.S. patent application Ser. No. 08/176,804, now abandoned, entitled "Method and Apparatus for Performing Load Operations in a Computer System", filed on Jan. 4, 1994 and assigned to the corporate assignee of the present invention.

The TLB 504 and the PMH 501 are intended to represent a broad category of these elements found in most computer systems. MOB 503 will be described in further detail below with additional references to the remaining figures.

Figure 6:
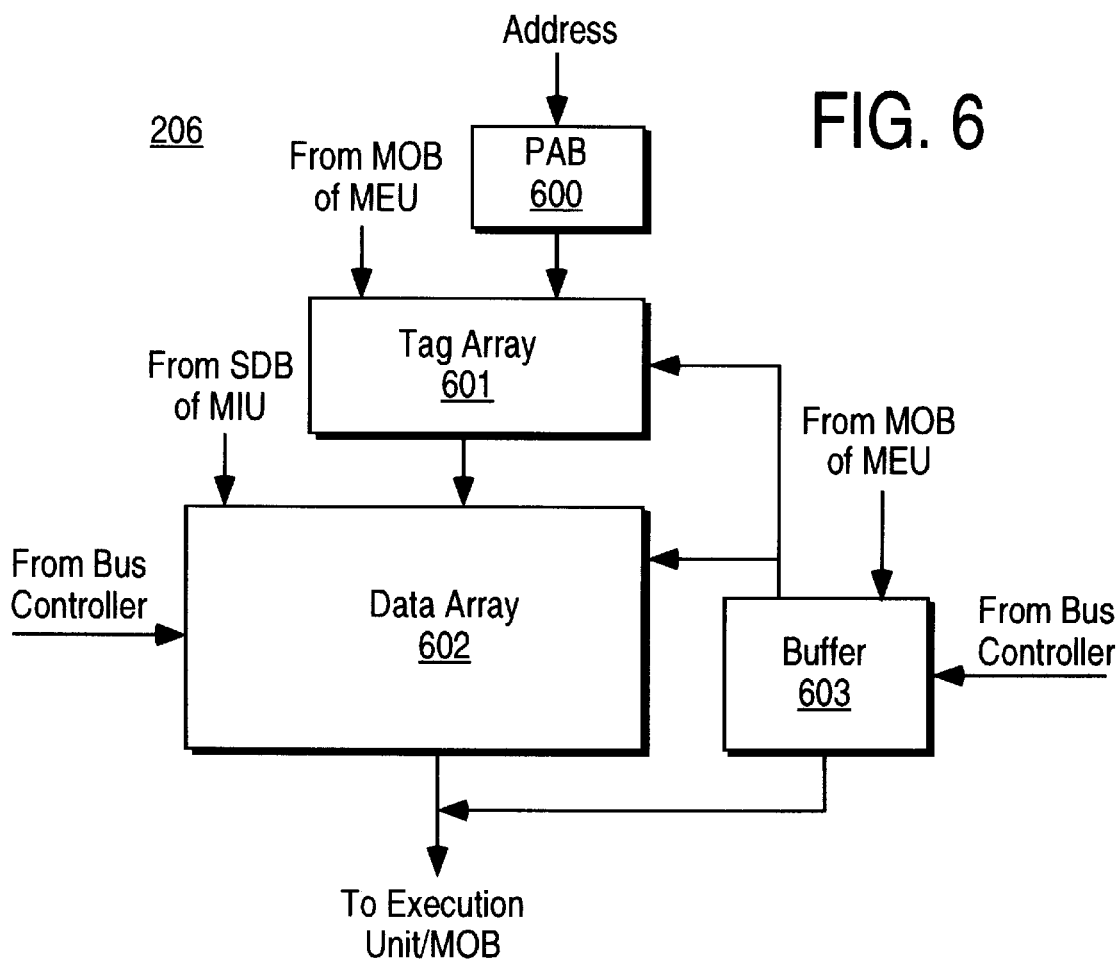
FIG. 6 is a block diagram of the relevant portions of the data cache of the present invention.

FIG. 6 is a block diagram of one embodiment of the data cache memory of the present invention. Referring to FIG. 6, the data cache memory 206 comprises a physical address buffer (PAB) 600, data tag array 601 and a data array 602 and queue 603. PAB 600 is coupled to receive an input (e.g., the physical address) from the TLB of the MEU and is coupled to produce physical address to tag array 601. Tag array 601 is coupled to receive an input (e.g., either store address or load address) from the MOB of the MEU. Data array 602 is coupled to receive an input from tag array 601 and the store data buffer (SDB) of the MEU, as well as being coupled to the bus controller. In response, data array 602 produces an output to the execution core. Queue 603 is also coupled to tag array 601 and data array 602. Queue 603 is also coupled to receive an input from the MOB as well as the bus controller.

The PAB 600 receives and saves the 24 high order bits of the translated physical addresses from the TLB of the MEU for the store and load operations, and in cooperation with the MOB and MIU, commits them to processor state and executes them as appropriate. Data tag array 601 stores the physical address tags of the data currently being cached in data array 602 and tag matches the accessing physical addresses against the stored physical address tags. Data array 602 receives and stores the data currently being cached and responds to data loads. In one embodiment, data tag array 601 and data array 602 have sufficient capacity for storing 128 sets of 2-way set associative 32-byte cache lines of data and their corresponding address tags. PAB 600, in cooperation with the MOB of the data cache controller, will be discussed in further detail below. TAG array 601 and data array 602 are intended to represent a broad category of these elements found in most computer systems, whose functions and constitutions are well-known and will not be further described.

Queue 603 contains accesses to data cache memory 206 that miss the cache memory and are currently pending on the bus. The entries in queue 603 are also checked where the data cache memory is accessed to determine if the desired data is stored in one of its entries or there is a request for that cache line currently pending on the bus. Queue 603 includes storage locations for temporarily storing the data returned for those pending operations. Queue 603 supplies the data and its tag information to data array 602 and tag array 601 respectively. In one embodiment, the queue 603 includes four entries having a 256 bit width (one cache line).

Figure 7:
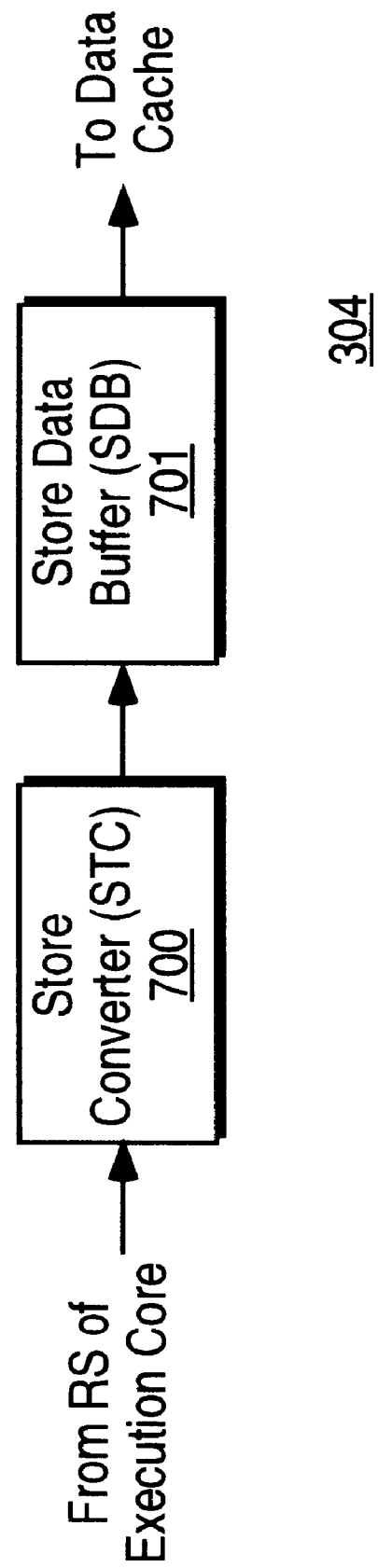
FIG. 7 is a block diagram of the relevant portions of memory interface unit of the present invention.

FIG. 7 is a block diagram of one embodiment of the relevant portions of the MIU of the execution unit of the present invention. Referring to FIG. 7, the MIU 304 comprises a store converter (STC) 700 and a store data buffer (SDB) 701, coupled to each other, such that store converter 700 receives data from the reservation station of the execution unit and sends data to SDB 701. SDB 701 then sends the data onto the data cache memory.

The STC 700 converts the floating point data of the STD operations. The SDB 701 receives and stores the STD operations and in cooperation with the store address buffer (SAB) of the data cache controller, and the PAB of the data cache, retires/commits the STD operations as appropriate, and causes them to be executed. The functions and constitutions of the STC 700 are well-known and will not be further described. SDB 701 and its cooperation with the SAB and PAB, will be described in further detail below.

Figure 8:
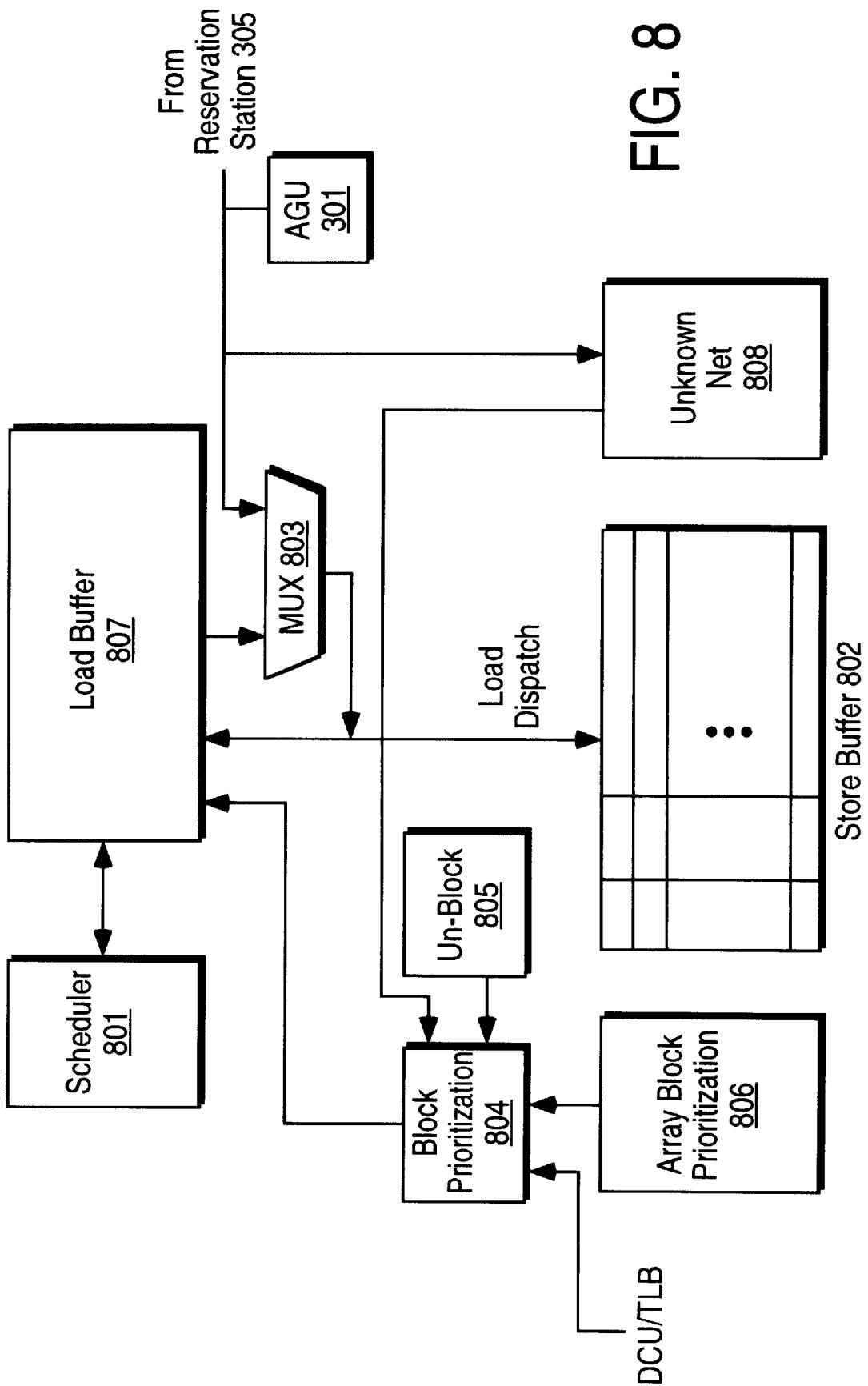
FIG. 8 is a block diagram of the relevant portions of the memory order system of the present invention.

FIG. 8 is a block diagram of one embodiment of the relevant portions of the memory order buffer (MOB). Referring to FIG. 8, the MOB comprises scheduler 801, load buffer (LB) 807, multiplexer (MUX) 803, block prioritization logic 804, unconditional block 805, array block prioritization 806, store buffer 802, and unknown net block 808. Scheduler 801 is coupled to load buffer 807. Load buffer 807 is coupled to block prioritization 804, store buffer 802 and MUX 803. Block prioritization logic 804 is also coupled to receive an input from the TLB and the data cache memory, unknown net 808, array block prioritization 806 and unconditional block 805. Unknown net 808 and MUX 803 are also coupled to the reservation station via the dispatch bus.

The SAB 802 stores the remaining operands and partial replications of the page denoting portions of the store destination addresses of buffered STA operations. The SAB 802, in cooperation with the SDB of the MIU and the PAB of the data cache memory, retires/commits the STA operations as appropriate, and causes them to be dispatched.

LB 807 also is coupled to receive a copy of the load operations dispatched form the RS via MUX 803. Load operations are copied into LB 803. LB 803 provides the stored load operations to the TLB and the execution pipe upon dispatch. MUX 803 receives loads from load buffer 807 and from the dispatch bus and outputs one for dispatch to memory.

Unknown net 808, unconditional block 805 and array block prioritization 806 determine if a specific set of condition exist that would cause or require a particular load operation to be prevented from executing. Each of these will be described below later. Block prioritization logic 804 receives conflicts/conditions/identification signals to block load and initiate operations stored in LB 807. Block prioritization logic indicates the status of load operations through signals sent to LB 807. Scheduler 801 schedules load operations for dispatch to memory based on their status. For more information on preventing load operation execution using the above referenced units and blocks, see U.S. patent application Ser. No. 08/176,804, entitled "Method and Apparatus For Performing Load Operations in a Computer System", filed on Jan. 4, 1994 and assigned to the corporate assignee of the present invention.

Figure 9:
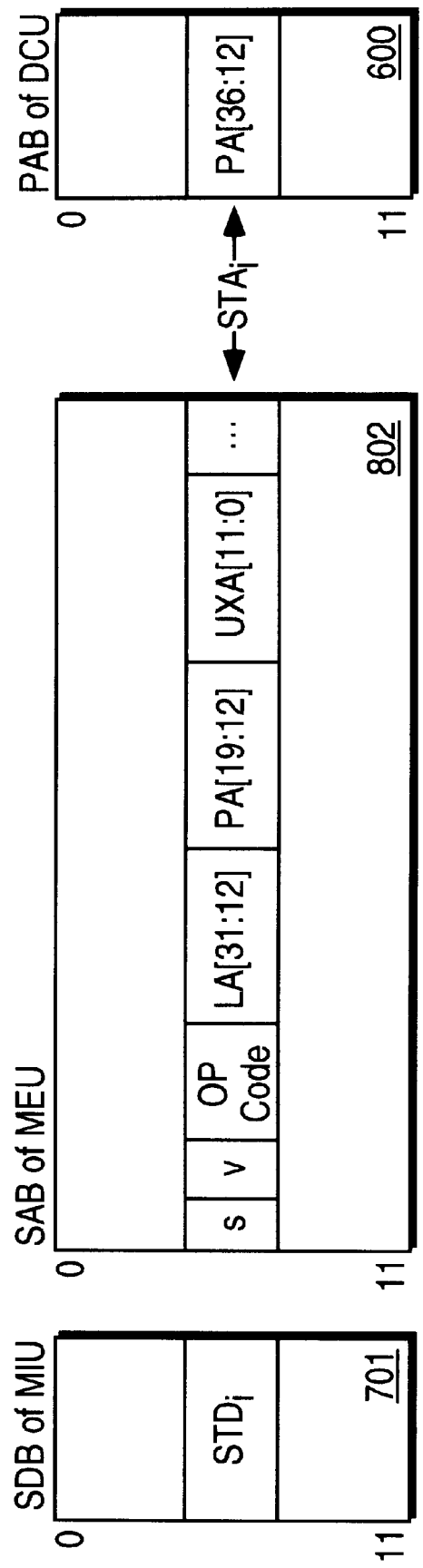
FIG. 9 is a block diagram depicting the interaction between the store address buffer the store data buffer and the physical address buffer.

FIG. 9 is a block diagram of one embodiment of the PAB, the SDB and the SAB. The PAB 600, the SDB 701 and SAB 802 all comprise an equal number of buffer slots. In one embodiment, up to a maximum of 12 buffer slots are included. The STD and STA operations of the store instructions are stored in corresponding buffer slots of the PAB 600, SDB 701 and SAB 802. More specifically, the 24 high order bits of the physical address (PA [36:12]) are stored in the buffer slot in the PAB 600. The STD operation is stored in a corresponding buffer slot and the SDB 701. The STA operation, including the valid bit, the OP code, the 20 high order bits of the linear address (LA[31:12]), and the 12 page offset designating bits of the address (UXA[11:0]), is stored in a corresponding buffer slot in the SAB 802. Additionally, the 8 lower order bits of a page designated portion of the physical address (PA [19:12]) of the STA operation are replicated in the buffer slot in the SAB 802. The STD and STA operations of most store operations are promoted to a "senior" state, i.e. ready for retirement or commitment, in due course, when their respective preceding instructions have been retired/committed or promoted to the "senior" state. The "senior" STD and STA operations are then executed in the "background" in due course when the data cache is free and then purged from the SDB 701, the SAB 802 and the PAB 600. The STD and STA operations of some of the store instructions, such as those storing data to memory locations mapped to I/O devices, are not eligible to be promoted to the "senior" state. The store data and store operations of these store instructions are retired/committed, and purged from the SDB 701, the SAB 802 and the PAB 600 concurrent with their executions. In other words, when the target I/O devices are ready to accept the data being "stored", then the execution occurs. In one embodiment, the linear addresses are driven from the SAB 802 to the TLB again, and the newly generated PA is directly provided to the tag array of the data cache, bypassing the PAB of the data cache memory. Additionally, if a store instruction involves storing data to memory locations spanning two cache lines, the data cache controller signals the data cache memory, and the STD and STA operations are driven to the data cache memory twice, with the data size and the physical address being adjusted accordingly the second time.

Performing Load Operations

In the present invention, a load operation is performed in response to a load instruction. The load instruction is received by the instruction fetch and issue unit which decodes the load instruction. The issue and fetch unit sends the decoded load operation to the reservation station for dispatch to the memory subsystem when any data dependencies between the load operation and other operations are resolved.

Once in the memory subsystem, the linear address for the load can be either bypassed directly from the AGU 505 or can come from the MOB load buffer 807. The upper 20 bits of the linear address are translated by the DTLB into a physical address. The data cache memory 206 uses these physical address bits along with the lower 12 bits of the untranslated address to do a tag array look-up and data array read (if needed). If the load operation "hits" the cache memory 206, then the data is read out of the data cache memory data array, aligned and then passed on to a load converter (not shown to avoid obscuring the present invention). The load converter then converts the data into the proper internal format recognized by the processor and writes it back on the writeback bus. If the load misses the data cache memory 206, a request for data will be made to the bus controller 204. After the data is retrieved by the bus controller 204, either from an L2 cache memory or external memory, the data cache memory 206 requests a cycle on the writeback bus to return the requested data. When the data cache memory 206 has received a grant for a cycle or the writeback bus, it forwards its data to the load converter which drives it on the writeback bus after format conversion.

When performing load operations in the present invention, the load operation is dispatched for execution to the memory subsystem. Once a load operation has been dispatched, the data cache memory 206 and the DTLB also begin providing a blocking status, while the MOB detects one or more address conflicts. Using the blocking status condition and the address conflict information, the MOB prioritizes the conditions and conflicts to determine if the load operation should be allowed to continue in execution. If the load cannot be completed due to a conflict, it is halted, or blocked. That is, the DCU aborts the load request. In this case, the MOB creates a block code identifying the event that must occur, if any, before the load can be completed. Once the appropriate event has been observed, the load operation may "wake up" and be redispatched for execution.

Once a load has been awakened, there is no guarantee that it will complete during the next execution cycle. The load operation may not complete because it may be blocked again for the same or different reasons. For example, a load may be blocked by the MOB on its initial dispatch because of an address conflict with a store operation that has been dispatched previously and is currently pending. When the operation that generates that address is dispatched, the load operation is awakened and redispatched. The redispatched load may be blocked by the data cache memory due to a pending load operation for the same cache line for a different load currently executing in the system. When the appropriate data is returned, the load operation will wake up and be redispatched. Once redispatched, the load may block again, or complete with returned data.

The load operations that are blocked are stored in the load buffer. In one embodiment, the load buffer contains sixteen entries. Therefore, at most 16 load operations can be pending in the processor at any one time. As many as 16 load operations may "wake up" in a given cycle. Since only one load is dispatched every cycle (in the preferred embodiment), the MOB must queue the load operations that are awake for dispatch. Queuing is performed by the load buffer by tagging loads as "ready" when they wake up. The load buffer then schedules for dispatch one of the "ready" loads each cycle. This ready/schedule mechanism allows the throughput of one load scheduled per cycle.

Thus, the memory of the system is organized such that it receives the loads dispatched to the memory subsystem one per cycle. The MOB performs multiple load blocking checks during this time to determine if load can be executed without conflicts (since the reservation station dispatches purely on data dependency). Checking for address and resource dependencies, the MOB gathers all the blocking conditions and prioritizes them to determine the highest priority. The load operation is stored and tagged with the block code and prevented from completion if a conflict exists (e.g., it is blocked). The operation of the memory system is monitored to determine when the conditions causing a particular load to be block no longer exist. At this time, the load is allowed to redispatch.

The status of the load operation is written into the load buffer. In one embodiment, the load status may be one of four designations: invalid, valid and completed, valid and blocked, or valid and not blocked. Each load gets written into its load buffer with the status and the load buffer uses these status bits to determine when the load operation is to execute in subsequent cycles. If there are no blocks or faults or other similar associated conditions/conflicts, then the load operation is sent to the data cache memory and assigned a load status of valid and completed. It should be noted that this does not necessarily mean that the load operation has been executed. With respect to writing back to the reservation station and ROB, the load operation has not completed (e.g., because there may have been a cache miss). From the MOB's standpoint, however, it is completed and no further action needs to be taken by the MOB. If a fault occurs with respect to the load operation, it is marked as valid and completed. Note that these faults may be indicated by the TLB or an AGU. The load operation may not have actually happened, but as far as the MOB is concerned the operation has been completed. If a page miss occurs with respect to the load operation, then the load operation is marked invalid. In the case of a page miss, the page miss handler processes the page a page walk and redispatches the load.

The valid and blocked and the valid and not blocked status are a function of multiple conditions and conflict determinations. The MOB, TLB and data cache memory provide the information to determine whether or not the status should be blocked or not. In one embodiment, these different conditions are prioritized to allow a general information field for determining when to redispatch a load operation. For more information on load blocking and wake up, see U.S. patent application Ser. No. 08/176,804, now abandoned, entitled, "Method and Apparatus For Performing Load Operations in a Computer System", filed on Jan. 4, 1994 now U.S. Pat. No. 5,724,536 and U.S. application Ser. No. 08/177,164 entitled, "Method and Apparatus For Performing Load Operations in a Computer System", filed Jan. 4, 1994 and assigned to the corporate assignee of the present invention.

Load Buffer Management

The load buffer contains load operations waiting for execution and stores load operations until they retire (committed to permanent architectural state). They are stored in the load buffer to ensure processor ordering. The load operations are also stored in the load buffer to perform blocking and wake up management and to maintain memory consistency.

As described above, one embodiment of the load buffer is a circular buffer with sixteen entries. The load buffer entries are allocated by the allocator in the issue and fetch unit, up to three per clock cycle. The case and functions of an allocator are well-known to those skilled in the art. The allocator allocates load buffer entries in instruction order as they are decoded. The load operations are sent to the RS and dispatch to the memory execution unit where they are stored sequentially in the load buffer. The load operations are deallocated from the load buffer in the same manner.

In order to perform the allocation of the load operations to the load buffer, the allocator must know what load buffer entries are in use. The load buffer is supported by a head pointer and a tail pointer which are managed to provide the load buffer with the necessary information regarding the entries that are currently is use in the load buffer. The tail pointer indicates the oldest load in the processor. The tail pointer points to the load operation that will be performed first out of all the load operations. The head pointer indicates the last entry in the load buffer to be dispatched and storing the load indicative of the next location in the load buffer to allocate. The tail pointer is sent to the allocator every clock. Note that in one embodiment, the load buffer is a circular buffer, such that the allocation and deallocation of the load operations wraps around the buffer in a circular fashion.

The allocator obtains new operations from the decoder and allocates them to the ROB, places them in the reservation station and allocates them to the MOB if they are load and store operations. If there are already sixteen load operations currently in the processor, the processor must stall. The tail pointer is used by the allocator to determine the state and availability of entries in the load buffer.

Each load operation is assigned a four bit ID, referred to herein as the LBID, corresponding to its eventual write location in the load buffer. An operation is allocated a load buffer entry if it requires accessing memory to return data, consistency with store operations, synchronization with retirement, or snooping for processor ordering. Note that the load buffer does not monitor allocation of load operations, and does not see these operations until they are dispatched from the reservation station.

The load buffer deallocates load operations from the load buffer as they retire. In other words, the load buffer entries are deallocated as the load operations are committed to permanent architectural (e.g., system) state. The ROB controls retirement and may retire up to three operations per clock cycle. Therefore, the load buffer may deallocate up to three entries per clock cycle.

As described, the load buffer maintains and sends the tail pointer to the allocator. The allocator maintains an indication as to the available entries in the load buffer in response to the tail pointer. The load buffer and the allocator extend the load buffer pointers by one bit, referred to herein as the wrap bit, to manage buffer full and empty conditions. With the allocator maintaining the wrap bit internally and the load buffer sending it along with the tail pointer, the allocator is able to distinguish between the empty and full states of the load buffer. The load buffer is empty when the head pointer is the same as the tail pointer and the wrap bit associated with the head pointer is the same as the wrap bit associated with the tail pointer. The load buffer is full when the head pointer is the same as the tail pointer and the wrap bit associated with the head pointer is different than the wrap bit associated with the tail pointer. The load buffers toggle the wrap bit each time the LBID pointer crosses the boundary between the last and first entry (e.g., 15 and 0 respectively).

The load buffer is flushed on all external or internal resets. Internal resets may be generated to clear the ROB and may be performed in response to the occurrence of a fault, error, mispredicted branch, etc. When the load buffer is flushed, all load operations in the load buffer are cleared and the tail pointer and the head pointer are set to zero (e.g., the first entry). The tail pointer wrap bit of the load buffer is set to 0. In this manner, an empty condition in the load buffer is indicated.

Load Buffer Tail Pointer Update

The present invention provides for managing the tail pointer based on deallocation. The tail pointer advances through the load buffer as per deallocation. The tail pointer is sent to the allocator to prevent overflowing allocation of load buffer entries. The tail pointer is also used internally by the load buffer to bias scheduling towards older operations.

In one embodiment, the tail pointer is maintained internally as a bit vector where one (flag) bit is set at any time, pointing to the load buffer entry that is at the tail. At every clock, there can only be one flag set. That is, there can only be one tail. The tail pointer is updated based on retirement of load operations. In one embodiment, the new tail pointer points to the oldest non-retired load operation in the load buffer. Since the ROB can retire up to three operations each cycle, the load buffer is able to accommodate up to three load operations deallocating per clock cycle.

In one embodiment, each bit of the tail pointer is computed independently. If an entry in the load buffer is deallocating, then its corresponding tail pointer bit is set to zero (e.g., cleared). If an entry is not deallocating and the entry immediately preceding in the load buffer is deallocating, then the tail pointer bit is set (to 1), indicating that the entry contains the oldest non-retired load operation in the processor. Otherwise, the tail pointer retains its value. Thus, the present invention operates as a serial carry chain and that each entry and determination of whether it is the tail pointer depends on itself and the entry immediately before it.

During reset, all of the entries undergo deallocation. The deallocation of all the entries clears out all of the valid bits in the load buffer. Upon reset, the tail pointer bit for the first entry (e.g., entry 0) is set to 1, and the remaining tail pointer bits are set to zero. Note that the entry designated at the first entry in the load buffer may be chosen by the designer and does not have to be the first entry.

Thus, bits in the tail pointer may be set or reset based on deallocation and reset.

Once generated, the tail pointer is encoded and sent to the allocator. The load buffer also maintains the load buffer tail pointer wrap bit, which the allocator uses to distinguish between the empty and full conditions. In one embodiment, the wrap bit toggles if the last entry in the load buffer (e.g., entry 15) is deallocating. As a result of reset, the wrap bit is cleared (set to 0).

By generating the tail pointer, the present invention allows the execution of load operations to be managed in an out-of-order environment.

One Embodiment of the Tail Pointer Generator

Figure 10:
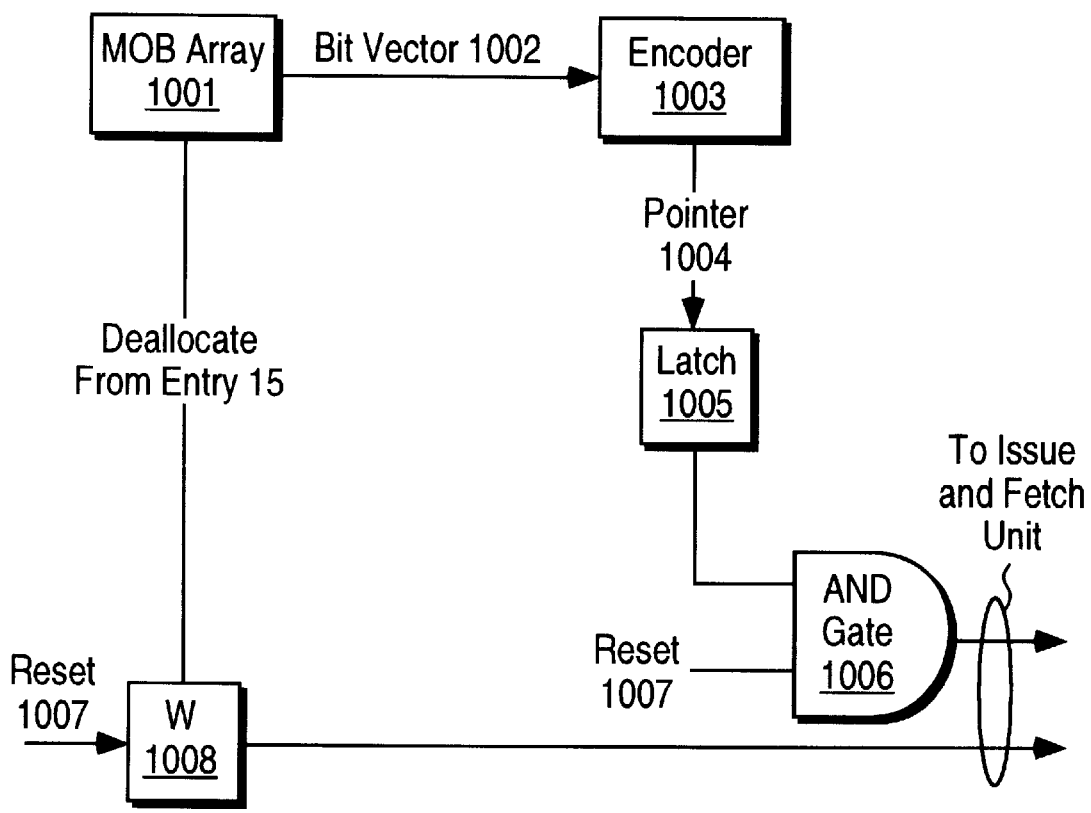
FIG. 10 is a block diagram of one embodiment of the tail pointer generator of the present invention.

FIG. 10 is a block diagram of one embodiment of the tail pointer generator of the present invention. Referring to FIG. 10, the MOB array 1001 provides a bit vector 1002 to an encoder 1003. Bit vector 1002 comprises the updated tail pointer bits for each of the entries in the load buffer. In one embodiment, bit vector 1002 comprises a 16 bit vector.

In response to bit vector 1002, encoder 1003 produces a four-bit pointer 1004. The four-bits 1004 produced by encoder 1003 are latched by a latch 1005.

The latched pointer 1004 is input to one input of AND gate 1006. The other input to AND gate 1006 is coupled to a reset indication (e.g., signal) 1007. In one embodiment, AND gate logic 1006 comprises a plurality of AND gates, wherein each the AND gate receives reset indication 1007 and a separate bit of the latched pointer 1004. In one embodiment, the reset indication 1007 is an active low signal. While the reset indication 1007 is not asserted, AND gate 1006 passes the latched pointer 1004. The output of AND gate 1006 is the tail pointer that is sent to the allocator. If the reset indication 1007 is asserted, the output of AND gate 1006 is all zeros. Thus, the allocator starts allocating loads from the first entry in the load buffer (once the processor is out of reset).

Also shown in FIG. 10 is a wrap bit 1008 that is generated by the MOB array 1001. Since the load buffer has a limited number of entries, the wrap bit 1008 in conjunction with the head and tail pointers allows the allocator of the present invention to determine when the load buffer is full or empty. In one embodiment, the wrap bit 1008 is not needed if one entry of the load buffer is never used.

In one embodiment, the wrap bit 1008 is set whenever the tail pointer moves from location 15 in the load buffer to location 0, thereby indicating a wrapping around the buffer. After the initial setting of the wrap bit 1008, the wrap bit 1008 toggles between one and zero. The wrap-bit 1008 is sent to the allocator. Note that the wrap bit 1008 is reset by reset signal 1007.

Load Buffer and Entry Deallocation

Each load buffer entry has state information associated with it that includes information such as a valid bit, a complete bit, a Pdst and an address. The valid and complete bits are used to indicate whether an entry is a valid entry and whether the operation contained therein has been completed, respectively. The Pdst indentifies the operation, while the address refers to the address associated with the load operation. At retirement, the ROB signals retirement of 1, 2 or 3 operations every clock. Each and every one of them may be load operations stored in the load buffer. The ROB signals the retirement of the operations by sending their Pdst. In one embodiment, these Pdsts are sent on a dedicated bus having three lines, one for each Pdst. Thus, each clock cycle, the ROB sends three retirement Pdsts.

The ROB also sends ROB valid bits that the load buffer receives. The ROB valid bits indicate which of the load operations that are associated with the incoming Pdsts are valid for retiring. In one embodiment, guarantee bits arrive to the load buffer one clock later and indicate that the specific loads are going to retire. Note that a guaranteed bit will be the same as the valid bit unless there has been a branch misprediction or some type of trap exception, such as in the case as when the ROB asserts an internal reset. In such a case, the load buffer is going to be purged anyway. Therefore, any inconsistency between the valid bits and guarantee bits is inconsequential.

Figure 11:
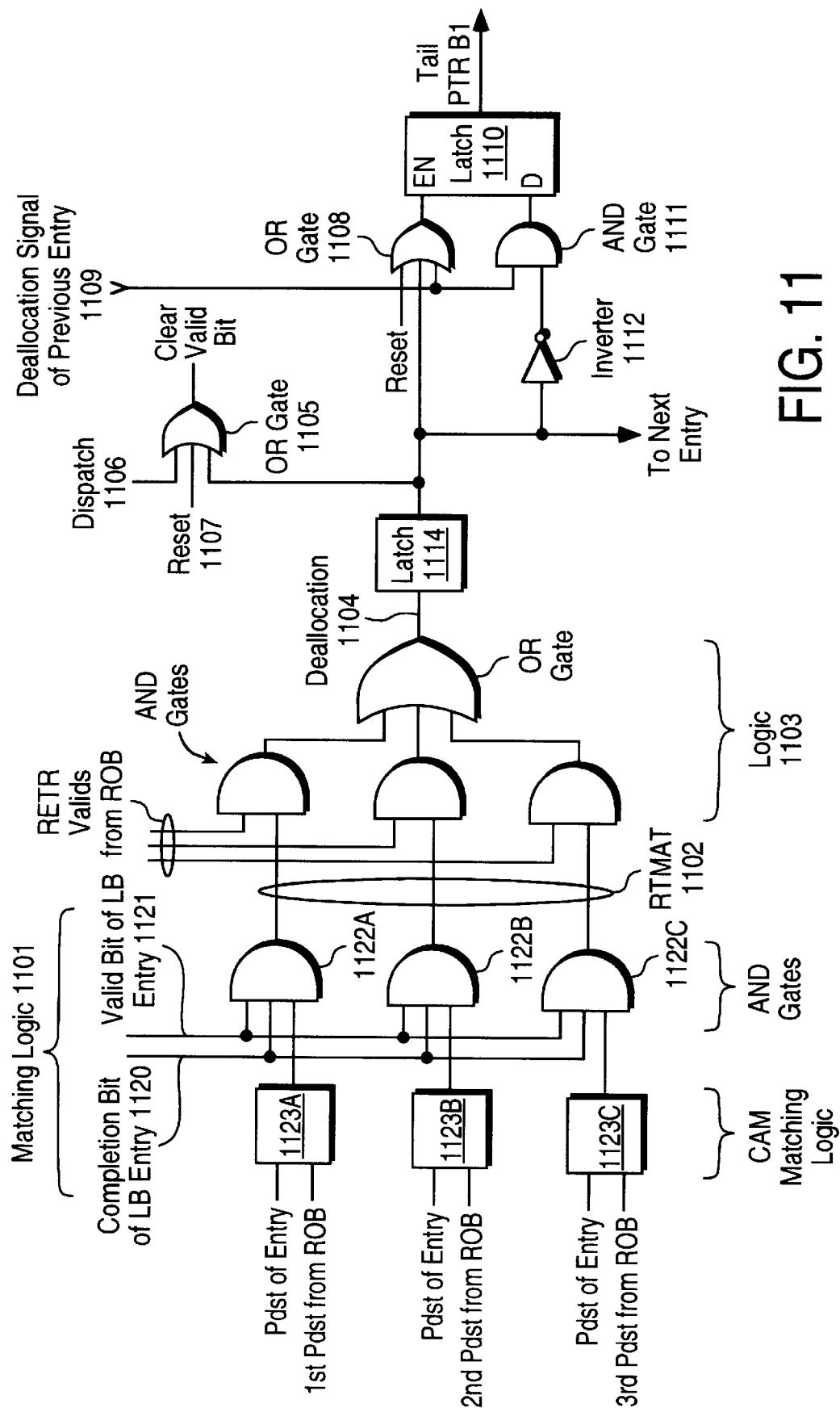
FIG. 11 is a circuit schematic of one embodiment of the tail pointer bit update logic of the present invention.

FIG. 11 illustrates tail pointer generation circuitry used for each entry of the load buffer. Referring to FIG. 11, the tail pointer generation circuitry 1100 is coupled to receive the Pdst of the load operation and the valid and complete bits of its associated load buffer entry as well as the Pdsts of the retiring operations and their valid bits from the ROB. In response to these inputs, the tail pointer circuitry 1100 generates the tail pointer bit for the entry that is used as part of the tail pointer bit vector.

The tail pointer generation circuitry 1100 comprises matching logic 1101 that determines if the Pdst of the load operation stored in the entry matches one of the Pdsts of the operations designated for retirement by the ROB. In one embodiment, matching logic 1101 comprises content addressable matching (CAM) logic, such as CAM matching logic 1123A–C, each of which receive a copy of the Pdst for the entry and one of the retirement Pdsts from the ROB. Each CAM matching logic 1123A–C asserts a signal (high) if a match exists. Each of the outputs of CAM matching logic 1123A–C is coupled to an input of one of AND gates 1122A–C. AND gates 1122A–C also are coupled to receive the valid bit indication for the load buffer entry and the completion bit of the entry. If all of the signals are high, the output of the corresponding AND gate is high, thereby indicating a retirement match.

In one embodiment, matching logic 1101 determines if a retirement match exists. A retirement match (RTMAT) occurs when one of the Pdsts from the ROB matches the entry in the load buffer and the valid and complete bits of the entry in the load buffer are set. This may be summarized in the equation below:

$$\text{RTMAT} = \text{Pdst match AND Valid AND Complete.}$$

It should be noted that in one embodiment, load operations in the processor retire in the order of allocation. Therefore, if a retirement match is not found for a specific load operation in the load buffer, then any load that is younger than that load operation cannot retire.

The output of matching logic 1101 is a group of retirement match signals 1102, one for each match determination. In one embodiment, a retirement match is indicated by a 1, while a 0 indicates that a match did not occur. There can only be one match for each entry.

The retirement match signals 1102 and the ROB valid bits are coupled to inputs of logic 1103. In response to the inputs, logic 1103 generates a deallocation signal 1104. In one embodiment, logic 1103 comprises three AND gates (one for each retirement match). Each AND gate is coupled to receive one retirement match signal and its associated ROB valid bit. The outputs of the AND gates are coupled to inputs of an OR gate. If any one of the retirement match signals 1102 is asserted and its corresponding ROB valid bit is asserted, then the output of the OR gate, and thus the output of logic 1103, is asserted. The asserted output of logic 1103 comprises an initial deallocation indication.

A latch 1114 latches the initial deallocation signal output from logic 1103. Latch 1114 allows this deallocation signal to be saved until the next clock.

The latched deallocation signal is coupled to one input of invertor 1112 which inverts the signal. The output of inverter 1112 is coupled to one input of AND gate 1111. The other input of AND gate 1111 is coupled to receive signal 1109 indicating whether the previous entry in the load buffer has been deallocted (e.g., transitioning from 1 to 0). When the deallocation signal is a 1 or the deallocation signal 1109 of the prevoius load buffer entry is a 0, the output of AND gate 1111 is 0. On the other hand, if the previous entry is deallocation (signal 1109 is 1) and the latched deallocation signal of the entry is 0, then the output of AND gate 1111 is 1. The output of AND gate 1111 is coupled to an input of latch 1110.

An OR gate 1108 is coupled to receive the latched deallocation signal, the deallocation signal 1109 of the previous load buffer entry and the reset signal 1107. If the previous load buffer entry has been deallocated, reset has been asserted or the latched deallocation signal is asserted, the output of the OR gate 1108 is 1.

The output of OR gate 1108 is coupled to an enable input of latch 1110. The enable determines if the bit retains its value. Note that the enable may not be required. The data input of latch 1110 is coupled to and provided by AND gate 1111. When the output of OR gate 1108 is high, the data from AND gate 1111 is latched into latch 1110. The output of latch 1110 is the tail pointer bit for the entry.

The latched deallocation signal is coupled to an input of OR gate 1105. Other inputs of the OR gate 1105 are coupled to a dispatch signal 1106, indicating that the load operation is dispatched, and a reset signal 1107. The dispatch signal 1106 is asserted when a load operation undergoes wake up and is read out of the load buffer array for dispatch to memory. If the dispatch signal 1106, reset signal 1107 or latched deallocation signal is asserted, the output of OR gate 1105 clears the valid bit for that particular load buffer entry. In other words, if the processor is under reset, if a load operation stored in the load buffer entry has been dispatched or the deallocation of the load operation occurs, its valid bit is cleared to indicate that the load buffer entry no longer contains a valid load operation and thus may be reallocated by the allocator.

The deallocation signal is also sent to the next entry in the load buffer for the determination of its tail pointer bit.

Figure 12:
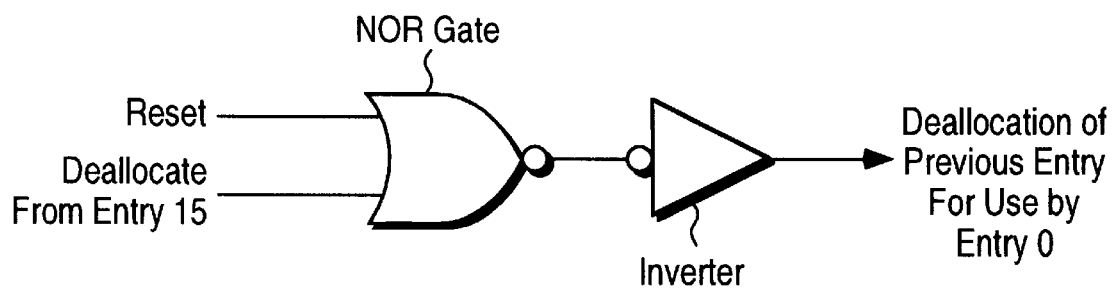
FIG. 12 is additional logic that is included in the tail pointer bit update logic used to set the tail pointer to the first entry in the load buffer during reset.

Note that in the tail pointer update logic for the first entry includes additional logic to cause the tail pointer bit to be set to 1 in response to a reset signal. This ensures that the allocator is made aware of where to start allocating newly issued load operations once the processor is brought out of reset. Such logic is shown in FIG. 12 where a NOR gate 1201 is coupled to receive not only the deallocation signal from the previous entry (e.g., load buffer entry 15) but the reset signal as well. The output of NOR gate 1201 comprises the previous deallocation signal that is received by the tail pointer bit update logic for the first entry (e.g., entry 0). This gives entry 0 the impression that entry 15 deallocated so that entry 0 is the tail pointer.

Figure 13:
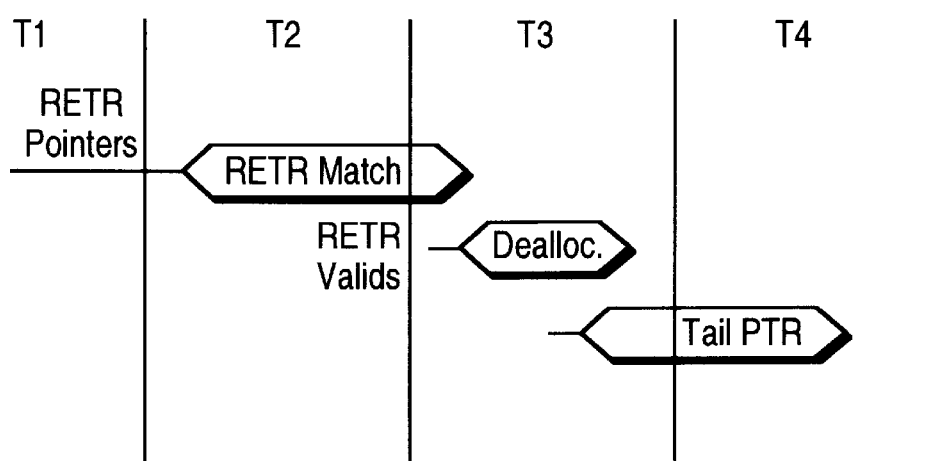
FIG. 13 is a timing diagram of the tail pointer update operation of the present invention.

FIG. 13 illustrates a timing diagram of the tail pointer bit update. Referring to FIG. 13, the retirement pointers are sent from the ROB in T1. In response to the retirement pointers, retirement match signals are are generated during T2. The ROB retirement valid signals are available near the end of T2. At the rising edge of the T3, the deallocation signal (from logic 1103) is asserted and latched by latch 1104. A short time thereafter in T3, the tail pointer bit output is generated and asserted through the first half of T4. Note that the deallocation signal is available prior to the time that the tail pointer bit is calculated for a particular entry. This allow the following load buffer entry to calculate its tail pointer bit so that all the tail pointer calculations can be performed nearly simultaneously.

In one embodiment, if either of the reset signals (e.g., external reset or internal reset) occurs during T2, then the MOB acts on these signal one clock later (T3). This may conflict with the generation of the deallocation signal. In case of an externally generated Reset signal being received by the processor, the conflict is not a problem because the reset signal is asserted for multiple cycles. In case of other signals causing reset of the processor (e.g., such as internally generated reset signals), the deallocation signal is prevented from being generated because the retirement valid signals are not available in T2.

If either the externally or internally generated reset signals are generated in T2, the deallocation signal generation is handled in T3 in the same way. That is, the tail pointer bit transitions to 0 and all valid bits are cleared.

If the reset signals are generated in T3, the tail pointer update logic ignores it, but is reset during the next clock cycle (T4).

In sum, each entry calculates its own tail pointer bit which is a function of its own deallocation signal plus the deallocation signal of the entry that proceeds it in the load buffer ordering. Each tail pointer is combined to form a tail pointer vector. There is no dependency on the tail pointer bit of one entry on the other entry in the load buffer.

Note that in another embodiment, the tail pointer update logic may comprises a full look ahead circuitry in which every entry receives data generated for the other entries. This may not be a desirable embodiment based on the expense required giving each entry the ability to monitor every other entry.

Thus, the present invention provides a buffer management scheme in which 0, 1, 2 or 3 load operations stored in a buffer may be returned, while the mechanism for allocating those buffer entries always maintains an indication of buffer status and entry availability.

The tail pointer may be handled as a counter, such as a four-bit binary counter that is incremented as the load operations are deallocating. In one embodiment, counter wraps around it and reset, if a reset occurs. However, in one embodiment, 0, 1, 2 or 3 loads may deallocate every clock. In such a case, the tail pointer is able to stay the same, increment by one, increment by two or increment by three. However, maintaining a decoded flag is cheaper than using a counter. Note that storing a decoded flag is also cheaper than using a counter.

In this manner, the present invention maintains and updates a tail pointer. By doing so, the tail pointer may be used for such activities as, for instance, scheduling calculations and processor ordering.

Whereas many alterations and modifications of the present invention will no doubt become apparent to a person of ordinary skill in the art after having read the foregoing description, it is to be understood that the various embodiments shown and described by way of illustration are in no way intended to be considered limiting. Therefore, references to details of various embodiments are not intended to limit the scope of the claims which in themselves recite only those features regarded as essential to the invention.

Thus, an apparatus for coordinating the retirement of load operations has been described.

We claim:

1. A processor for use in a system, said processor comprising:

an issue unit to issue operations including load operations in response to instructions fetched from memory;

an array coupled to the issue unit having entries allocated in a circular wraparound manner to store a predetermined number of load operations prior to dispatch to memory for execution;

an array management mechanism coupled to the array, wherein the array management mechanism maintains an indication as to which entry contains an oldest non-retired load operation among the predetermined number of load operations and updates the indication when one or more load operations are deallocated from the array based on retirement of said one or more load operations if one or more load operations, respectively, retire, where the indication comprises a bit vector maintained as a serial carry chain and having a bit associated with each load operation which is set to indicate whether its associated stored load operation is the oldest non-retired load operation when said one entry is not deallocating and another of said entries immediately preceding said one entry is deallocating during a current clock cycle.

2. The processor defined in claim 1 whereas the indication is updated every clock cycle.

3. The processor defined in claim 1 wherein the array management mechanism updates the indication based on whether none, one, two or three load operations in the array are retired during the current clock cycle.

4. A memory order mechanism to coordinate execution of load operations in a processor for use in a system, said mechanism comprising:

a memory array having entries to store a predetermined number of load operations prior to dispatch for execution to memory, wherein entries of the memory array are allocated in a circular wraparound manner;

an array management mechanism coupled to the array, wherein the array management mechanism maintains a pointer indicative of which of the predetermined number of entries contains an oldest non-retired load operation among the predetermined number of load operations, wherein the array management mechanism updates the pointer when one or more load operations are deallocated from the memory array based on retirement of said one or more load operations if said one or more load operations, respectively, retire, further wherein the pointer comprises a bit vector maintained as a serial carry chain, the bit vector having bits corresponding to each of the predetermined number of entries, and further wherein one of said bits corresponding to an entry containing the oldest non-retired load operation is the only bit set in the bit vector at any time; and an encoder coupled to the array management mechanism to generate a value indicative of the next available entry in the memory array.

5. The memory order mechanism defined in claim 4 wherein the pointer is updated every clock cycle.

6. The memory order mechanism defined in claim 4 further comprising logic coupled to receive the value and a reset indication, wherein the logic outputs the value if the reset indication is not asserted and outputs a predetermined value if the reset indication is asserted.

7. The memory order mechanism defined in claim 6 wherein the logic comprises an AND gate coupled to receive the output from the encoder and the reset indication as inputs and output the output from the encoder when the reset indication is an active low signal.

8. The memory order mechanism defined in claim 6 wherein the predetermined value is indicative of the first entry in the memory array.

9. The memory order mechanism defined in claim 4 wherein said one bit is set if said one entry was not deallocating and another of said entries immediately preceding said one entry is deallocating during the clock cycle.

10. The memory order mechanism defined in claim 4 further comprising matching logic to match the load operation of the entry to a plurality of operations selected for retirement and asserting a signal indicating the entry is to be deallocated if a match exists, and bit generation logic receiving the signal and an indication as to whether the previous entry in the array is deallocating and setting the bit when the previous entry in the array is deallocating and the signal does not indicate that the entry is deallocating.

11. The memory order mechanism defined in claim 10 wherein the matching logic comprises CAM logic.

12. The memory order mechanism defined in claim 10 wherein the circuitry further comprises logic to set an entry to a state that indicates that the entry is not containing a valid operation.

13. The memory order mechanism defined in claim 12 wherein the logic clears the valid bit of the entry.

14. The memory order mechanism defined in claim 12 wherein the logic clears the valid bit in response to the load operation in the entry being dispatched to memory, a reset indication is asserted or the signal is asserted.

15. A memory order mechanism to coordinate execution of load operations in a processor for use in a system, said mechanism comprising:

a memory array having entries to store a predetermined number of load operations prior to dispatch for execution to memory, wherein the entries are allocated in a circular wraparound manner;

an array management mechanism coupled to the array, wherein the array management mechanism maintains a pointer indicative of which of the predetermined number of entries contains an oldest non-retired load operation among the predetermined number of load operations, wherein the array management mechanism updates the pointer every clock cycle when one or more load operations are deallocated from the memory array based on retirement of said one or more load operations if said one or more load operations, respectively, retire during a clock cycle;

wherein the pointer comprises a plurality of bits maintained as a serial carry chain, each bit corresponding to one of the predetermined number of entries and generated by circuitry associated with each of the predetermined number of entries, said circuitry comprising matching logic to match a load operation of the entry to a plurality of operations selected for retirement and asserting a signal indicating the entry is to be deallocated if a match exists, and bit generation logic receiving the signal and an indication as to whether the previous entry in the array is deallocating and setting the bit when the previous entry in the array is deallocating and the signal does not indicate that the entry is deallocating.

16. The memory order mechanism defined in claim 15 wherein the matching logic asserts the signal if an identifier for the load operation in the entry matches any identifier for operations designated for retirement.

17. The memory order mechanism defined in claim 16 wherein the matching logic asserts the signal if an identifier for the load operation in the entry matches any identifier for operations designated for retirement and the matching identifier is valid and the load operation is valid and complete.

18. The memory order mechanism defined in claim 17 wherein the matching logic is coupled to receive valid bits for each identifier of operations designated for retirement that indicate the validity of said each identifier.

19. The memory order mechanism defined in claim 17 wherein the array stores at least one valid bit for each of the predetermined number of entries, wherein the matching logic receives the valid bit for the load operation to determine its validity.

20. The memory order mechanism defined in claim 15 further comprising logic to set an entry to a state that indicates that the entry is not containing a valid operation.

21. The memory order mechanism defined in claim 20 wherein the logic clears the valid bit of the entry.

22. The memory order mechanism defined in claim 20 wherein the logic clears the valid bit in response to the load operation in the entry being dispatched to memory, a reset indication is asserted or the signal is asserted.

* * * * *